(No Model.)  G. A. McSURELY.  2 Sheets—Sheet 1.
SWEEP RAKE.

No. 246,027.   Patented Aug. 23, 1881.

Witnesses.
F. L. Durand
P. W. D. Durand

Inventor,
George A. McSurely
by Heylmun + Kane
Attorneys, (No Model.) 2 Sheets—Sheet 2.

G. A. McSURELY.
SWEEP RAKE.

No. 246,027. Patented Aug. 23, 1881.

Witnesses,
F. L. Ourand
T. W. N. Ourand

Inventor,
George A. McSurely.
by Heylmun & Kane
Attorneys.

UNITED STATES PATENT OFFICE.

GEORGE A. McSURELY, OF WHEAT RIDGE, OHIO.

SWEEP-RAKE.

SPECIFICATION forming part of Letters Patent No. 246,027, dated August 23, 1881.

Application filed May 24, 1881. (No model.)

*To all whom it may concern:*

Be it known that I, GEO. A. MCSURELY, a citizen of the United States, residing at Wheat Ridge, in the county of Adams and State of Ohio, have invented certain new and useful Improvements in Sweep-Rakes; and I do hereby declare the following to be a full, clear, and exact description of the invention, such as will enable others skilled in the art to which it appertains to make and use the same, reference being had to the accompanying drawings, and to letters or figures of reference thereon, which form a part of this specification.

Figure 1:
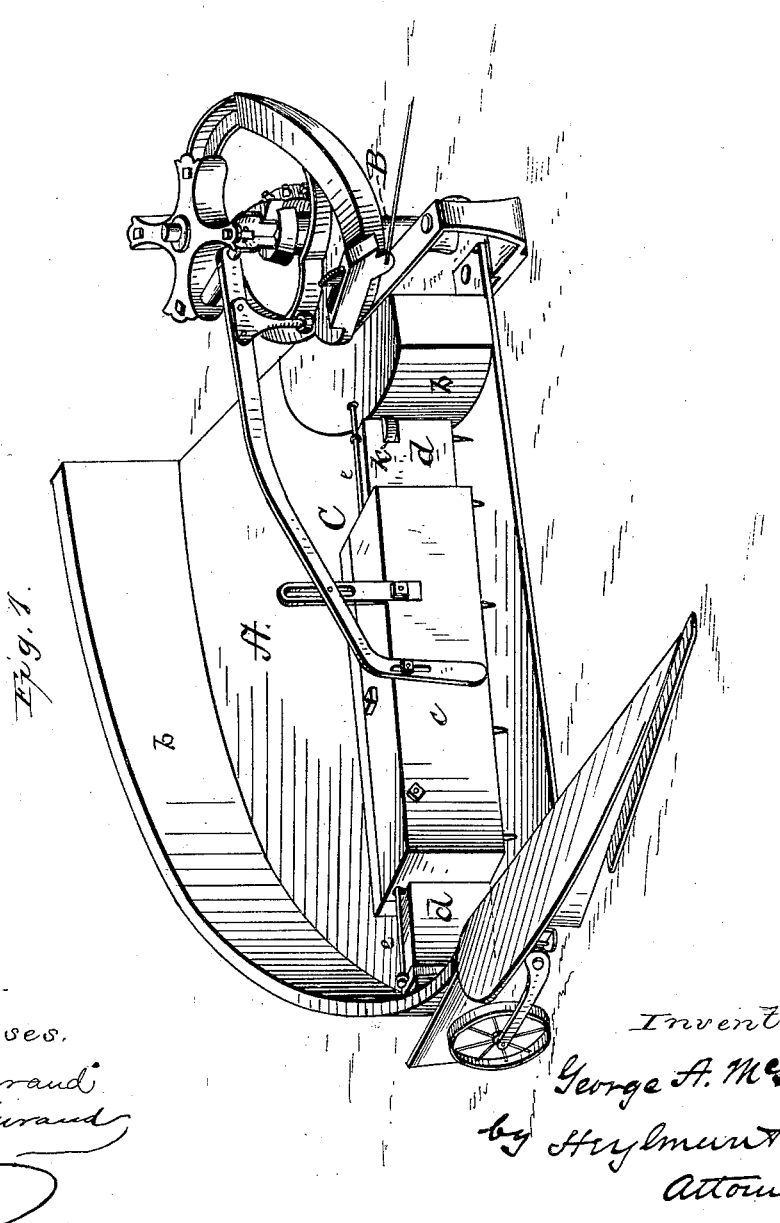
Figure 2:
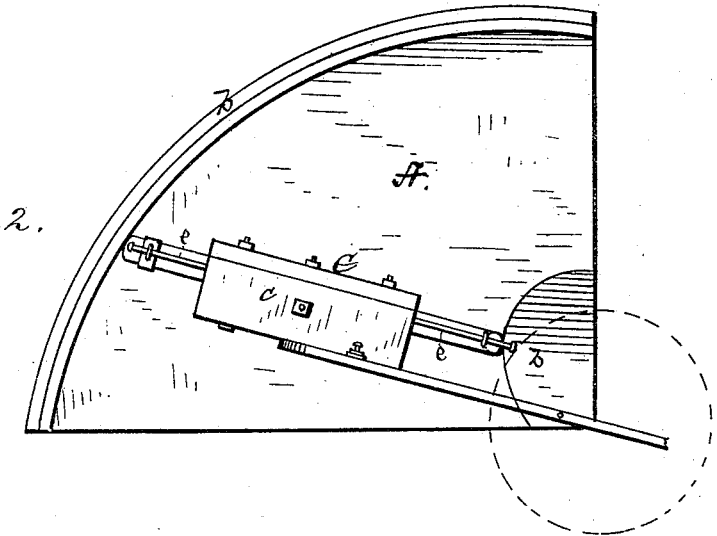
Figure 3:
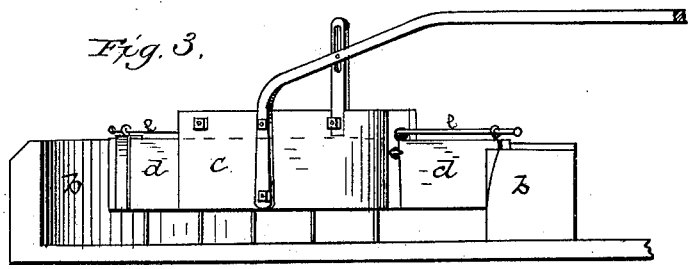
Figure 4:
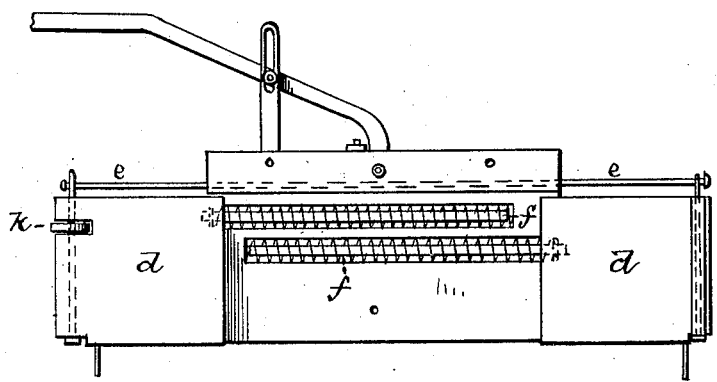

Figure 1 of the drawings is a perspective view of my improved sweep-rake. Fig. 2 is a plan view of the same. Fig. 3 is a front view of the same. Fig. 4 is a front view of the rake with one of the sides removed to show more fully the operative parts.

This invention relates specially to the class of "sweep-rakes" employed on harvester-machines for removing the fallen grain from the platform to the rear of the same; and the objects of the same are to construct the curved or quadrant shaped platform, narrower at the rear or discharge-end than at the front end, and to provide, in connection with such a platform, an expansible rake that will conform to the varying widths of the platform in discharging the grain from the same.

My improvements consist in the novel construction and combination of parts, as will be hereinafter more fully set forth and specifically claimed.

In the annexed drawings, the letter A represents a curved platform attached to a harvester or reaper in any of the well-known ways. This platform, which is provided with the ordinary post or shaft, B, affording the bearing or bearings for the sweep-rakes, is made quadrant-shaped, or is more like an irregular sector of a circle. The inner and outer edges of this quadrant-shaped platform are provided with flanges *b*, extending above the horizontal plane of the platform a short distance, for the purpose hereinafter stated. These flanges *b* are so arranged that the front end of the platform is considerably wider than at the rear or discharge end of the platform, but a gradual varying width is preserved. On the post or shaft of the platform is mounted a rake-head, having attached thereto the sweep-rakes, having the usual rising and falling movement, caused by mechanism or gearing to sweep and discharge the fallen grain from the platform.

The letter C represents the rake having the expansible and contractible movements, composed of a boxing or casing, *c*, and the independent side arms or slides *d* projecting from opposite ends of the boxing. The inner face of one of the side pieces forming the boxing is formed with two parallel grooves or recesses, having their open ends in opposite directions, as seen in Fig. 4 of the drawings, and arranged within these grooves are the rods *f*, which are surrounded by coil-springs, one end of which is made fast within the groove and the other end to a sliding arm or section of the rake. To the upper portion of the box-casing is secured a rod, *e*, with projecting ends, over which pass the loops or eyes arranged at the outer ends of the sliding arms, substantially as shown in the drawings. The office of the same is to guide the said sections and maintain the same in a horizontal plane in the extended positions. These loops or eyes of the sliding arms are attached thereto in a suitable manner, preferably by means of bolts having the eyes formed on the upper ends.

To the rake, near the inner edge-face of the upper end, is journaled an anti-friction roller, *k*, for the purpose of assisting and aiding the easy movement of the rake through the guide-ways of the platform. It is obvious that two or more of these anti-friction rollers may be journaled on the vertical edge of this sliding arm of the rake; also, anti-friction rollers may be applied to the outer edge of the rake. The lower edge of the boxing or casing and the sliding arms are provided with rake-teeth which act upon the platform to gather and discharge the grain. It will be observed that as the rakes fall and enter upon this platform the inner and outer sliding arms of the rake will come in contact with the outer and inner guide-flanges or edges of the platform, and as the rake recedes in its movement the outer and inner sections of the rake are adjusted inward toward the center of the rake-head or boxing, and this inward movement continues gradually with the varying width of the platform; and as the rake moves upon the platform in the direction of the rear or discharge end the fallen grain is drawn toward the center by the inward action of the sliding arms, caused by the guide-flanges of the platform, thereby gathering or compressing the grain more closely into gavels for binding.

I do not wish to confine my invention to the specific construction of parts, as hereinbefore described and shown, as it is obvious that slight changes may be made without departing from the spirit of the invention.

What I claim as my invention, and desire to secure by Letters Patent, is—

1. A rake composed of the casing or boxing $c$ and the expansible and contractible sections $d$, the inner section being provided with anti-friction roller, substantially as and for the purpose set forth.

2. A rake consisting of the casing or boxing $c$, formed on its inner face with two parallel grooves or recesses, with the open ends in opposite directions, the sections $d$, and rods $f$, surrounded by coil-springs, substantially as described.

3. In a rake, the combination of the two expansible and contractible sections $d$, formed at their outer ends with loops or eyes, and a guide-rod, $e$, substantially as and for the purpose set forth.

4. The combination of the quadrant-shaped platform with the guide-flanges $b\ b$ and the rake, composed of the casing $c$, formed on its inner face with parallel grooves, with the open ends in opposite directions, the movable sections $d$, and rods $f$, surrounded by coil-springs, substantially as described.

In testimony whereof I affix my signature in presence of two witnesses.

GEORGE A. McSURELY.

Witnesses:
L. B. CLARK,
J. W. McCLUNG.